United States Patent
Moore et al.

(10) Patent No.: US 7,387,134 B2
(45) Date of Patent: Jun. 17, 2008

(54) FIRE SAFETY DEVICE FOR PROPANE CYLINDERS

(75) Inventors: Joel Reese Moore, New Braunfels, TX (US); Gregory A. Reitsma, Ceresco, MI (US); Robert Clifton Jones, Jr., Mountain City, TX (US)

(73) Assignee: S.H. Leggitt Company, San Marcos, TX (US)

( * ) Notice: Subject to any disclaimer, the term of this patent is extended or adjusted under 35 U.S.C. 154(b) by 322 days.

(21) Appl. No.: 11/093,881

(22) Filed: Mar. 30, 2005

(65) Prior Publication Data
US 2005/0217725 A1    Oct. 6, 2005

Related U.S. Application Data

(60) Provisional application No. 60/557,616, filed on Mar. 30, 2004.

(51) Int. Cl.
*F16K 17/38* (2006.01)
(52) U.S. Cl. .............................. 137/74; 137/75
(58) Field of Classification Search .............. 137/74, 137/75, 234.5
See application file for complete search history.

(56) References Cited

U.S. PATENT DOCUMENTS

| | | | | | |
|---|---|---|---|---|---|
| 2,033,512 | A | * | 3/1936 | Carliss | 137/234.5 |
| 3,245,423 | A | * | 4/1966 | Hansen et al. | 137/74 |
| 3,730,205 | A | * | 5/1973 | Guimbellot | 137/75 |
| 4,280,523 | A | * | 7/1981 | Norton | 137/74 |
| 4,290,440 | A | * | 9/1981 | Sturgis | 137/75 |
| 4,488,566 | A | * | 12/1984 | Hicks | 137/74 |
| 4,792,115 | A | * | 12/1988 | Jindra et al. | 137/74 |
| 4,825,893 | A | * | 5/1989 | Gailey | 137/75 |
| 4,932,431 | A | * | 6/1990 | Silagy | 137/74 |
| 5,020,563 | A | * | 6/1991 | Hoffman et al. | 137/75 |
| 5,027,845 | A | * | 7/1991 | Silagy | 137/74 |
| 5,472,008 | A | * | 12/1995 | Boarin | 137/75 |
| 5,787,918 | A | * | 8/1998 | Jensen | 137/75 |

* cited by examiner

*Primary Examiner*—John Rivell
(74) *Attorney, Agent, or Firm*—Price, Heneveld, Cooper, DeWitt & Litton, LLP (57) ABSTRACT

A fire safety fluid flow device for engagement with a Schrader valve including a sliding valve a housing having a fluid path therethrough and a pressing member. The pressing member presses against the sliding valve of the Schrader valve when engaged therewith to allow fluid flow through the Schrader valve. The pressing member continues to maintain the sliding valve in an open position when the device is below a predetermined temperature and connected to the Schrader valve. The pressing member is configured to no longer press against the sliding valve of the Schrader valve at and above the predetermined temperature to allow the sliding valve of the Schrader valve to thereby stop fluid flow through the Schrader valve.

24 Claims, 4 Drawing Sheets

FIRE SAFETY DEVICE FOR PROPANE CYLINDERS

CROSS-REFERENCE TO RELATED APPLICATION

The present application claims priority to Provisional Patent Application Ser. No. 60/557,616, filed on Mar. 30, 2004, entitled FIRE SAFETY DEVICE FOR PROPANE CYLINDERS.

FIELD OF THE INVENTION

This invention is applicable to a wide range of devices having a supply of flammable fluid, but is particularly advantageous for use with propane outdoor cooking appliances and space heaters.

BACKGROUND OF THE INVENTION

Some outdoor cooking appliances and space heaters are connected to a source of propane to cook the food and heat a space, respectively. Typically, the cooking appliances and the space heaters are connected to a cylinder holding liquefied petroleum in liquid and/or vapor form. If the cooking appliance and the space heater are small and portable, they are typically connected to a disposable propane cylinder. A problem with prior art cooking appliances and space heaters is that neither have a mechanism to extinguish the flow of gas from the fuel supply in the event of a fire. Heretofore, if the small cooking appliances and space heaters are in a fire, they will continue to supply propane as the supply of propane from the cylinder would not be shut off.

Accordingly, an apparatus which avoids the aforementioned disadvantages and has the aforementioned desired features has long been desired.

SUMMARY OF THE PRESENT INVENTION

An aspect of the present invention is to provide a fire safety fluid flow device for engagement with a Schrader valve including a sliding valve having an open position for allowing fluid flow through the Schrader valve and a closed position for preventing fluid flow through the Schrader valve. The fire safety fluid flow device comprises a housing having a fluid path therethrough, with the housing having a pressing member. The pressing member is located within the housing. The pressing member presses against the sliding valve of the Schrader valve when engaged therewith to move the pressing member to the open position from the closed position to allow fluid flow through the Schrader valve. The pressing member continues to maintain the sliding valve in the open position when the device is below a predetermined temperature and connected to the Schrader valve. The pressing member is configured to no longer press against the sliding valve of the Schrader valve at and above the predetermined temperature to allow the sliding valve of the Schrader valve to slide to the closed position to thereby stop fluid flow through the Schrader valve.

Another aspect of the present invention is to provide a connection assembly for a flammable fluid holding container. The connection assembly comprises a valve assembly and a fluid flow device. The valve assembly includes a sliding valve. The sliding valve has a first position allowing fluid flow therethrough and a second position preventing fluid flow therethrough. The valve assembly includes a biasing member biasing the sliding valve to the second position. The fluid flow device is configured to be engaged with the valve assembly. The fluid flow device includes a housing having a fluid path therethrough. The housing has a pressing member. The pressing member is located within the housing. The pressing member presses against the sliding valve when engaged with the valve assembly to move the pressing member to the open position from the closed position to allow fluid flow through the valve assembly. The pressing member continues to maintain the sliding valve in the open position when the device is below a predetermined temperature and connected to the valve assembly. The pressing member is configured to no longer press against the sliding valve of the valve assembly at and above the predetermined temperature to allow the sliding valve of the valve assembly to slide to the closed position to thereby stop fluid flow through the valve assembly.

Yet another aspect of the present invention is to provide a pressure regulator configured to be connected to a flammable fluid holding container having a Schrader valve including a sliding valve having an open position for allowing fluid flow through the Schrader valve and a closed position for preventing fluid flow through the Schrader valve. The pressure regulator comprises a pressure regulator housing and a fire safety fluid flow device. The pressure regulator housing has an inlet and an outlet. The pressure regulator regulates flow of fluid through the pressure regulator. The fire safety fluid flow device is for engagement with the Schrader valve and the inlet of the pressure regulator. The fire safety fluid flow device includes a fire safety housing having a fluid path therethrough. The fire safety housing has a pressing member. The pressing member is located within the fire safety housing. The pressing member presses against the sliding valve of the Schrader valve when the pressure regulator is engaged with the flammable fluid holding container to move the pressing member to the open position from the closed position to allow fluid flow through the Schrader valve. The pressing member continues to maintain the sliding valve in the open position when the device is below a predetermined temperature and connected to the Schrader valve. The pressing member is configured to no longer press against the sliding valve of the Schrader valve at and above the predetermined temperature to allow the sliding valve of the Schrader valve to slide to the closed position to thereby stop fluid flow through the Schrader valve.

The principal objects of the present invention include providing a fire safety device. The fire safety device is efficient in use, economical to manufacture, capable of a long operable life, and particularly adapted for the proposed use.

Other objects, advantages and features of the invention will become apparent upon consideration of the following detailed description, when taken in conjunction with the accompanying drawings. The above brief description sets forth rather broadly the more important features of the present disclosure so that the detailed description that follows may be better understood, and so that the present contributions to the art may be better appreciated. There are, of course, additional features of the disclosure that will be described hereinafter which will form the subject matter of the claims appended hereto.

In this respect, before explaining the preferred embodiment of the disclosure in detail, it is to be understood that the disclosure is not limited in its application to the details of the construction and the arrangements set forth in the following description or illustrated in the drawings. The fire safety device of the present disclosure is capable of other embodiments and of being practiced and carried out in various ways. Also, it is to be understood that the phraseology and terminology employed herein are for description and not limitation. Where specific dimensional and material specifications have been included or omitted from the specification or the claims, or both, it is to be understood that the same are not to be incorporated into the appended claims.

As such, those skilled in the art will appreciate that the conception, upon which this disclosure is based, may readily be used as a basis for designing other structures, methods, and systems for carrying out the several purposes of the present invention. It is important, therefore, that the claims are regarded as including such equivalent constructions as far as they do not depart from the spirit and scope of the present invention.

Further, the purpose of the Abstract is to enable the U.S. Patent and Trademark Office and the public generally, and especially the scientists, engineers and practitioners in the art who are not familiar with the patent or legal terms of phraseology, to learn quickly from a cursory inspection the nature and essence of the technical disclosure of the application. Accordingly, the Abstract is intended to define neither the invention nor the application, which is only measured by the claims, nor is it intended to be limiting as to the scope of the invention in any way.

These and other objects, along with the various features and structures that characterize the invention, are pointed out with particularity in the claims annexed to and forming a part of this disclosure. For a better understanding of the fire safety device of the present disclosure, its advantages and the specific objects attained by its uses, reference should be had to the accompanying drawings and descriptive matter in which there are illustrated and described the preferred embodiments of the invention.

While embodiments of the fire safety device are herein illustrated and described, it is to be appreciated that various changes, rearrangements and modifications may be made therein, without departing from the scope of the invention as defined by the appended claims.

BRIEF DESCRIPTION OF THE DRAWINGS

The following brief description of the figures, and the related figures themselves, exemplifies a particular preferred embodiment of the invention constituting the best mode presently contemplated. As will be understood, other embodiments of the invention as well as changes and variations in the particular structure shown in these figures are no doubt possible, and may very well suggest themselves to those skilled in the art after studying this disclosure and these figures.

DETAILED DESCRIPTION OF PREFERRED EMBODIMENT

Figure 1:
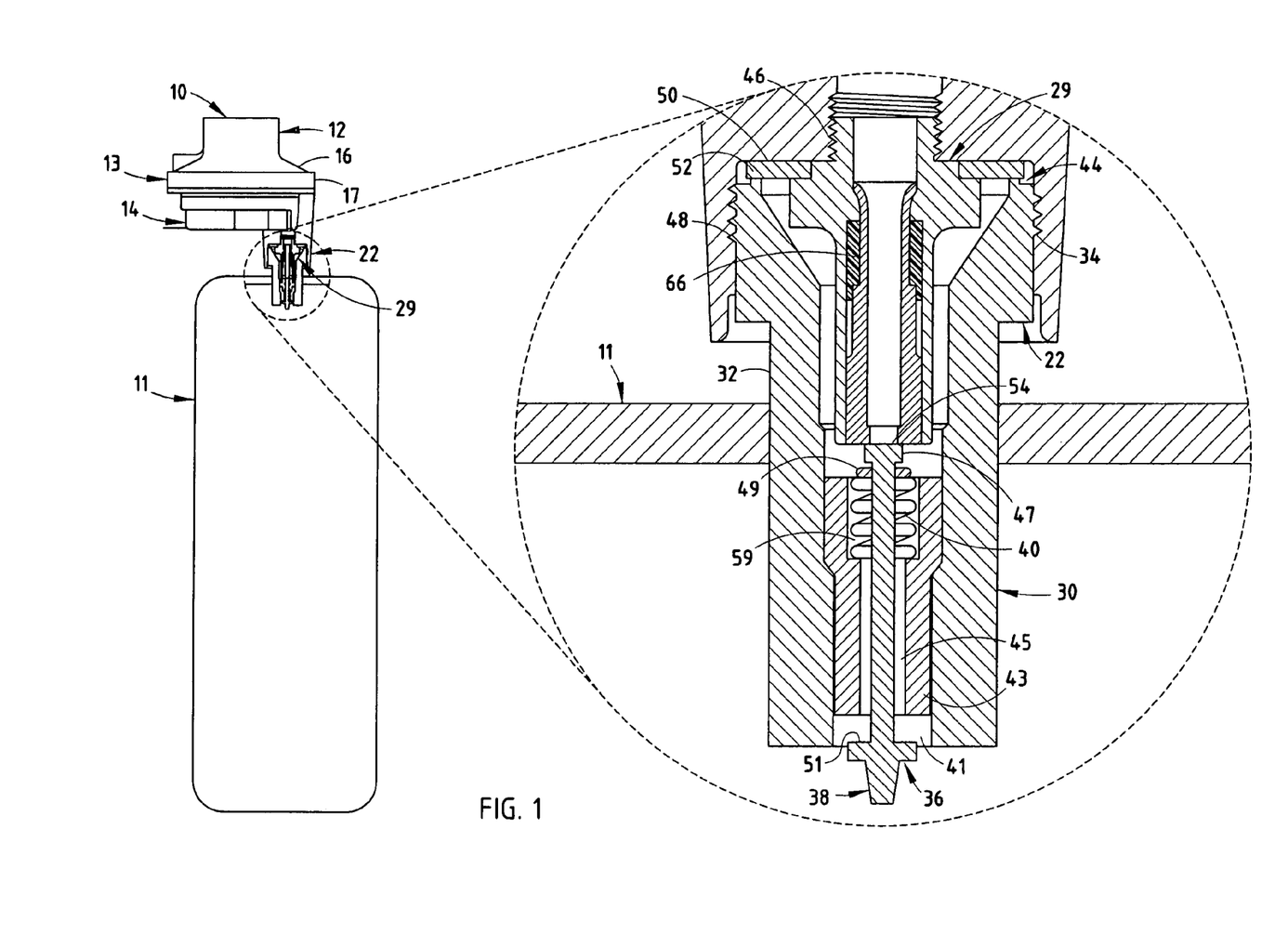
FIG. 1 is a side view of a pressure regulator and a propane cylinder with a portion thereof cut away and exploded to show a cross section of a probe and a connector of the propane cylinder during normal operation in accordance with the invention.
Figure 2:
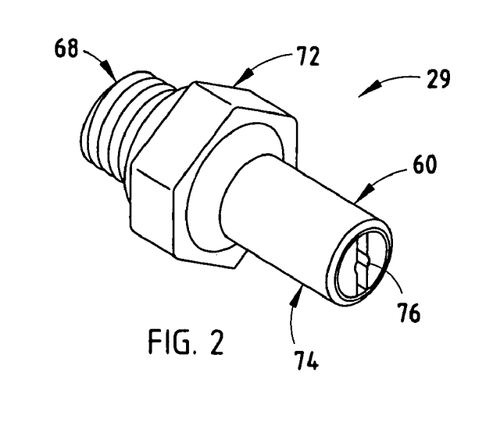
FIG. 2 is a perspective view of the probe in accordance with the invention.
Figure 3:
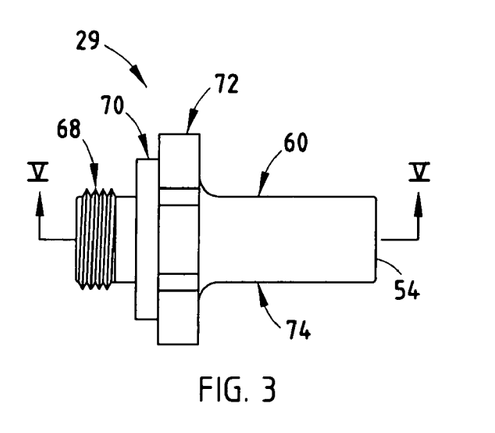
FIG. 3 is a side view of the probe in accordance with the present invention.
Figure 4:
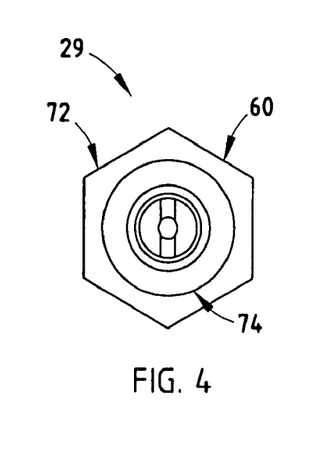
FIG. 4 is a front view of the probe in accordance with the present invention.
Figure 5:
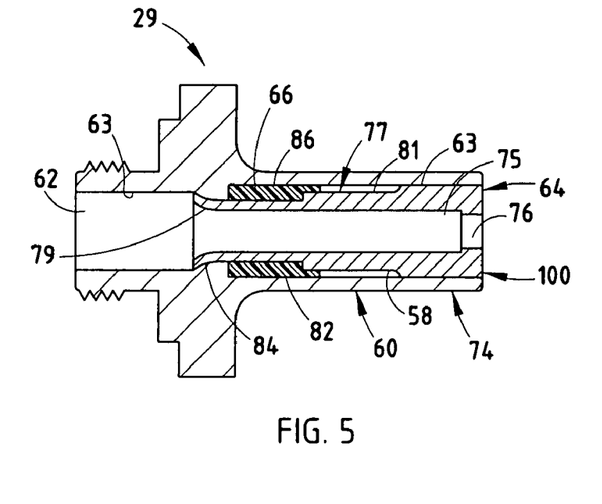
FIG. 5 is cross-sectional view of the probe taken along the line A-A of FIG. 3.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 (FIG. 1) generally designates a pressure regulator embodying the present invention. In the illustrated example, the pressure regulator 10 is connected to a propane cylinder 11. The pressure regulator 10 includes an upper body 12 (sometimes called the "bonnet") and a lower body 14. The upper body 12 and the lower body 14 may be substantially cylindrical. The lower body 14 is connected to the upper body 12 by mechanically deforming, or crimping, an upstanding flange 17 on the outside of an upper portion 13 of the lower body 14 over an outer flange 16 of the upper body 12. The crimp could also be reversed with a downward flange on the outside of the lower end of the upper body 12 and an outer flange on the lower body 14. Alternatively, the upper body 12 can have an outer flange at a lower end, which connects to the upper portion 13 of the lower body 14 by a plurality of threaded fasteners. The outer surface of the lower body 14 has an inlet port 22 and an outlet port (not shown) positioned perpendicular to the inlet port 22. In use, the inlet port 22 has a probe 29 therein for connection to propane cylinder 11 and the outlet port is connected to an appliance (not shown). The internal components of the pressure regulator 10 and the function thereof are well known to those skilled in the art. For example, the pressure regulator 10 could have the internal components of the pressure regulator disclosed in U.S. Pat. No. 6,668,855, the entire contents of which are hereby incorporated herein by reference. However, the pressure regulator could have any typical internal components.

The illustrated pressure regulator 10 includes the inlet port 22 configured to be connected to the propane cylinder 11. The inlet port 22 includes a two-step opening 44 with a smaller diameter section 46 and a larger diameter section 48. A shelf 50 with a seal 52 thereon defines the transition from the smaller diameter section 46 to the larger diameter section 48. Both the smaller diameter section 46 and the larger diameter section 48 include inside threaded surfaces. The smaller diameter section 46 is configured to have the probe 29 screwed therein and the larger diameter section 48 is configured to have the propane cylinder 11 screwed therein.

In the illustrated example, the propane cylinder 11 includes a connector 30 configured to be connected to the inlet port 22 of the pressure regulator 10. The connector 30 includes substantially cylindrical extension 32 extending from a top of the propane cylinder 11 and having outside threads 34 thereon. The cylindrical extension 32 is configured to be screwed into the larger diameter section 48 of the two-step opening 44 of the inlet port 22 of the pressure regulator 10 (see FIG. 1). The connector 30 also includes a "Schrader" valve 36 located within a bore 41 in the cylindrical extension 32. The "Schrader" valve 36 includes a housing 43 having an aperture 45 therein and a stem-like seal 38 located within the aperture 45. The stem-like seal 38 includes an enlarged head 47 at a top end thereof, an annular rib 49 in a middle section and a seal ring 51 at a bottom thereof. A spring 40 is located between the rib 49 of the stem-like seal 38 and a bottom of a counter-bore 59 in the housing 43 coextensive with the bore 41. The spring 40 biases the stem-like seal 38 upward in the housing 43 such that the seal ring 51 abuts against the bottom of the housing 43, thereby closing the bore 41 and stopping flow of fluid out of the propane cylinder 11 through the bore 41. In use, as the cylindrical extension 32 of the connector 30 of the propane cylinder 11 is screwed into the larger diameter section 48 of the two-step opening 44 of the inlet port 22, a tip 54 of the probe 29 of the pressure regulator 10 presses against the enlarged head 47 of the stem-like seal 38 to move the stem-like seal 38 against the force of the spring 40 to move the seal ring 51 away from the bottom of the housing 43, thereby opening up the "Schrader" valve 36 and allowing fluid flow out of the propane cylinder 11. It is contemplated that the "Schrader" valve as disclosed herein can have many configurations and such "Schrader" valves are well known to those skilled in the art.

The illustrated probe 29 (FIGS. 2-5) is connected to the inlet port 22 of the pressure regulator 10. The probe 29 includes an outer shell 60 having a hole 62 therethrough. The outer shell 60 includes a threaded portion 68, an annular seal abutting portion 70, a hexagonal portion 72 and a cylindrical portion 74. The threaded portion 68 is configured to be screwed into the smaller diameter section 46 of the inlet port 22 to connect the probe 29 to the inlet port 22. The annular seal abutting portion 70 is configured to accept the seal 52 thereon as the probe 29 is screwed into the inlet port 22. Furthermore, the hexagonal portion 72 is used to accept a tool thereon for easily rotating the probe 29. It is contemplated, however, that the outside surface of the probe 29 could have any configuration and could be connected to the pressure regulator 10 in any manner.

In the illustrated example, the probe 29 includes a thermal safety assembly 100 (FIG. 5) that abuts against the enlarged head 47 of the stem-like seal 38 of the "Schrader" valve 36 of the propane cylinder 11 to open the "Schrader" valve 36. The thermal safety assembly 100 includes a thermal probe 64 and a thermal bushing 66 located in the hole 62 of the outer shell 60. The hole 62 includes a first portion 58 and a second portion 63, with a ridge 84 therebetween. The thermal probe 64 and the thermal bushing 66 are located in the second portion 63. The thermal probe 64 includes an aperture 75 therethrough, a three-step outer surface 77 and a flared end 79. The thermal probe 64 also includes a substantially rectangular channel 76 at an end thereof. An end of the thermal probe 64 is flush with an end of the cylindrical portion 74 of the outer shell 60. The end of the thermal probe 64 pushes against the stem-like seal 38 of the "Schrader" valve 36 of the propane cylinder 11 to open the "Schrader" valve 36. The thermal bushing 66 surrounds a smallest portion 82 of the three-step outer surface 77 of the thermal probe 64. The thermal bushing 66 maintains the thermal probe 64 within the smaller diameter portion 63 of the hole 62 in the outer shell 60 of the probe 29. It is contemplated, however, that the thermal probe 64 could have a two-step outer surface, as long as the thermal bushing 66 is fixed in position relative to the thermal probe 64. Furthermore, it is contemplated that the thermal bushing 66 could be fixed relative to the thermal probe 64 in any manner.

Figure 6:
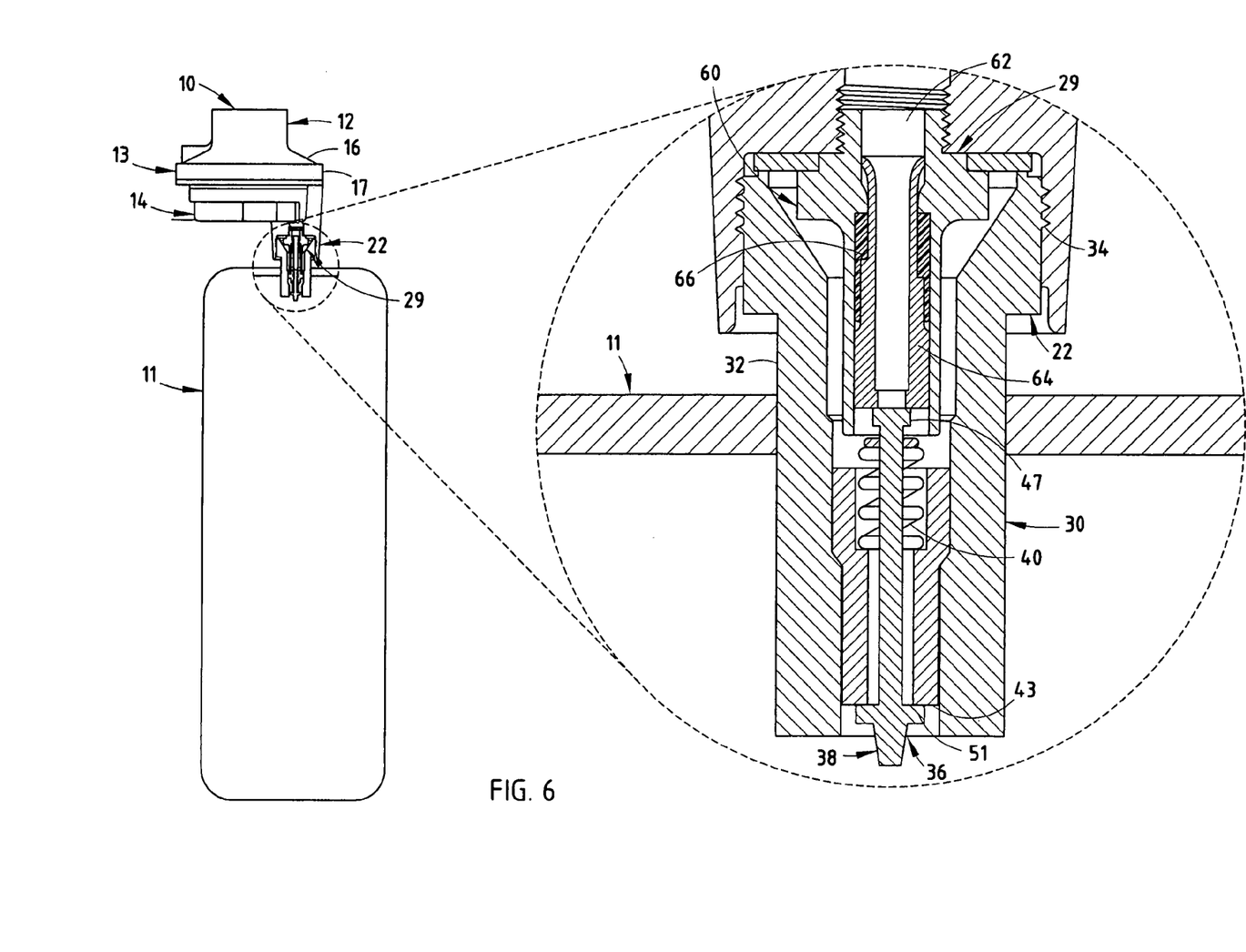
FIG. 6 is a side view of a pressure regulator and a propane cylinder with a portion thereof cut away and exploded to show a cross section of a probe and a connector of the propane cylinder during elevated temperatures of the pressure regulator in accordance with the invention.

The illustrated probe 29 is configured to stop fluid flow from the propane cylinder 11 into the pressure regulator 10 when the probe 29 reaches a predetermined temperature. As illustrated in FIG. 1, during normal use of the pressure regulator 10 and the propane cylinder 11, the end of the thermal probe 64 of the probe 29 (i.e., the tip 54) presses against the enlarged head 47 of the stem-like seal 38 of the "Schrader" valve 36 of the propane cylinder 11 to open the "Schrader" valve 36. In this position, the thermal probe 64 cannot be pushed into the hole 62 of the outer shell 60 of the probe 29 because the thermal bushing 66 is compressed between the ledge 84 and a shelf 86 between the smallest portion 82 of the three-step outer surface 77 and a middle portion 81 of the three-step outer surface 77. However, when the temperature of the probe 29 rises above the predetermined temperature, the thermal bushing 66 will melt or soften such that the thermal bushing 66 can no longer support any load without deforming. As illustrated in FIG. 6, once the thermal bushing 66 melts or softens, the enlarged head 47 of the stem-like seal 38 of the "Schrader" valve 36 of the propane cylinder 11 will push the thermal probe 64 into the hole 62 of the outer shell 60 of the probe 29, thereby allowing the spring 40 to expand and push the seal ring 51 (via the rib 49) against the bottom of the housing 43 and closing the "Schrader" valve 36 of the propane cylinder 11. The thermal bushing 66 is made of a plastic material or a metal alloy. Preferably, the thermal bushing 66 is made of eutectic alloy or linear low density polyethylene (LLDPE). Accordingly, the thermal safety assembly 100 ensures that the flow of propane from the propane cylinder 11 stops when there is a fire.

Figure 7:
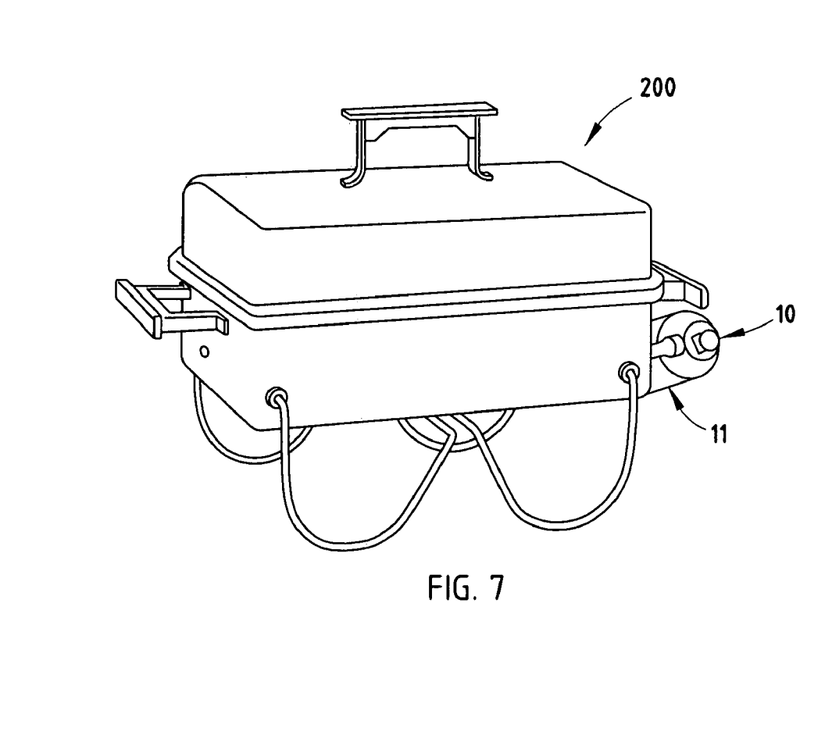
FIG. 7 is a perspective view of a grill using the pressure regulator of the present invention.
Figure 8:
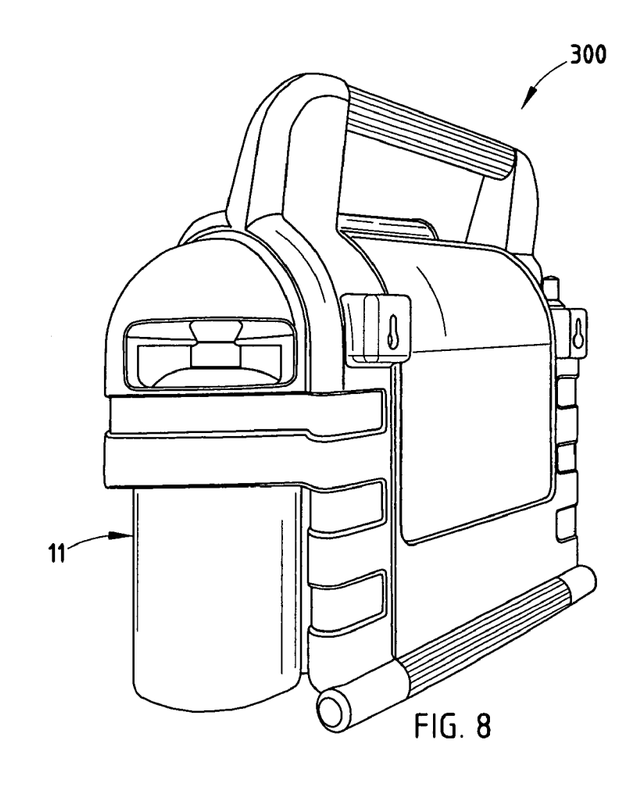
FIG. 8 is a perspective view of a space heater using the pressure regulator of the present invention.

FIG. 7 illustrates a grill 200 using the pressure regulator 10 and the propane cylinder 11 of the present invention. The illustrated probe 29 in the pressure regulator 10 will prevent flow of propane to the grill 200 during a fire. The grill 200 is sold by Weber-Stephen Product Co. of Palatine, Ill., under the name GAS GO-ANYWHERE portable grill. The grill 200 is disclosed in U.S. Pat. No. 4,627,408, the entire contents of which are hereby incorporated herein by reference. Likewise, FIG. 8 illustrates a space heater 300 using the pressure regulator 10 and the propane cylinder of the present invention. The illustrated probe 29 is preferably included in the space heater and will prevent flow of propane to the space heater 300 during a fire. The space heater 300 is sold by Mr. Heater Corporation of Cleveland, Ohio as Model No. MH9B PORTABLE BUDDY propane heater. The space heater 300 is disclosed in U.S. Pat. No. 6,648,635, the entire contents of which are hereby incorporated herein by reference. However, it is contemplated that the probe 29 and/or the thermal safety assembly 100 could be used in any connection with a "Schrader" valve to stop the flow of propane or any other fluid.

The foregoing detailed description is considered that of a preferred embodiment only, and the particular shape and nature of at least some of the components in this embodiment are at least partially based on manufacturing advantages and considerations as well as on those pertaining to assembly and operation. Modifications of this embodiment may well occur to those skilled in the art and to those who make or use the invention after learning the nature of this preferred embodiment, and the invention lends itself advantageously to such modification and alternative embodiments. For example, the probe 29 and/or the thermal safety assembly 100 could be part of the pressure regulator 10 or the propane cylinder 11. Furthermore, the probe 29 and/or the thermal safety assembly 100 could be used in any connection with a "Schrader" valve. Therefore, it is to be understood that the embodiment shown in the drawings and described above is provided principally for illustrative purposes and should not be used to limit the scope of the invention.

We claim:

1. A fire safety fluid flow device for engagement with a Schrader valve including a sliding valve having an open position for allowing fluid flow through the Schrader valve and a closed position for preventing fluid flow through the Schrader valve, the fire safety fluid flow device comprising:
a housing having a fluid path therethrough, the housing having a pressing member and a thermal member;
the pressing member being located within the housing, the pressing member pressing against the sliding valve of the Schrader valve when engaged therewith to move the sliding valve to the open position from the closed position to allow fluid flow through the Schrader valve;
the pressing member continuing to maintain the sliding valve in the open position when the device is below a predetermined temperature and connected to the Schrader valve; and
the pressing member being configured to no longer press against the sliding valve of the Schrader valve at and above the predetermined temperature to allow the sliding valve of the Schrader valve to slide to the closed position to thereby stop fluid flow through the Schrader valve;
wherein the pressing member includes at least a portion of the fluid path;
wherein the thermal member abuts, but is not connected to, an outside surface of the pressing member when the device is below the predetermined temperature to allow the pressing member to continue to maintain the sliding valve in the open position; and
wherein the pressing member is unable to be removed from the housing both above and below the predetermined temperature.

2. The fire safety fluid flow device of claim 1, wherein:
the thermal member melts or softens at or above the predetermined temperature to allow the pressing member to slide in the housing under a force of the sliding valve of the Schrader valve to thereby stop fluid flow through the Schrader valve.

3. The fire safety fluid flow device of claim 2, wherein:
the housing includes a hole therethrough; and
the pressing member and the thermal member are located in the hole of the housing.

4. The fire safety fluid flow device of claim 3, wherein:
the thermal member comprises a ring surrounding the pressing member.

5. The fire safety fluid flow device of claim 4, wherein:
the ring is located between a ridge in the hole of the housing and a step on an outside surface of the pressing member.

6. A fire safety fluid flow device for engagement with a Schrader valve including a sliding valve having an open position for allowing fluid flow through the Schrader valve and a closed position for preventing fluid flow through the Schrader valve, the fire safety fluid flow device comprising:
a housing having a fluid path therethrough, the housing having a pressing member;
the pressing member being located within the housing, the pressing member pressing against the sliding valve of the Schrader valve when engaged therewith to move the sliding valve to the open position from the closed position to allow fluid flow through the Schrader valve;
the pressing member continuing to maintain the sliding valve in the open position when the device is below a predetermined temperature and connected to the Schrader valve; and
the pressing member being configured to no longer press against the sliding valve of the Schrader valve at and above the predetermined temperature to allow the sliding valve of the Schrader valve to slide to the closed position to thereby stop fluid flow through the Schrader valve;
wherein the housing further includes a thermal member;
the thermal member maintaining the pressing member in position within the housing when the device is below a predetermined temperature;
the thermal member melting or softening at or above the predetermined temperature to allow the pressing member to slide in the housing under a force of the sliding valve of the Schrader valve to thereby stop fluid flow through the Schrader valve; and
wherein the housing includes an externally threaded end.

7. The fire safety fluid flow device of claim 6, wherein:
the housing includes a non-circular shaped outer surface portion to assist in rotating the housing to screw the externally threaded end into a fluid accepting device.

8. A connection assembly for a flammable fluid holding container comprising:
a valve assembly including a sliding valve, the sliding valve having a first position allowing fluid flow therethrough and a second position preventing fluid flow therethrough, the valve assembly including a biasing member biasing the sliding valve to the second position; and
a fluid flow device configured to be engaged with the valve assembly, the fluid flow device including a housing having a fluid path therethrough, the housing having a pressing member and a thermal member;
the pressing member being located within the housing, the pressing member pressing against the sliding valve when engaged with the valve assembly to move the sliding valve to the first position from the second position to allow fluid flow through the valve assembly;
the pressing member continuing to maintain the sliding valve in the first position when the device is below a predetermined temperature and connected to the valve assembly; and
the pressing member being configured to no longer press against the sliding valve of the valve assembly at and above the predetermined temperature to allow the sliding valve of the valve assembly to slide to the second position to thereby stop fluid flow through the valve assembly;
wherein the pressing member includes at least a portion of the fluid path;
wherein the thermal member abuts, but is not connected to, an outside surface of the pressing member when the device is below the predetermined temperature to allow the pressing member to continue to maintain the sliding valve in the first position; and wherein the pressing member is unable to be removed from the housing both above and below the predetermined temperature.

9. The connection assembly of claim 8, wherein:
the thermal member melts or softens at or above the predetermined temperature to allow the pressing member to slide in the housing under a force of the sliding valve of the valve assembly to thereby stop fluid flow through the valve assembly.

10. The connection assembly of claim 9, wherein:
the housing includes a hole therethrough; and
the pressing member and the thermal member are located in the hole of the housing.

11. The connection assembly of claim 10, wherein:
the thermal member comprises a ring surrounding the pressing member.

12. The connection assembly of claim 11, wherein:
the ring is located between a ridge in the hole of the housing and a step on an outside surface of the pressing member.

13. The connection assembly of claim 8, wherein:
the biasing member is a spring.

14. A connection assembly for a flammable fluid holding container comprising:
a valve assembly including a sliding valve, the sliding valve having a first position allowing fluid flow therethrough and a second position preventing fluid flow therethrough, the valve assembly including a biasing member biasing the sliding valve to the second position; and
a fluid flow device configured to be engaged with the valve assembly, the fluid flow device including a housing having a fluid path therethrough, the housing having a pressing member;
the pressing member being located within the housing, the pressing member pressing against the sliding valve when engaged with the valve assembly to move the sliding valve to the first position from the second position to allow fluid flow through the valve assembly;
the pressing member continuing to maintain the sliding valve in the first position when the device is below a predetermined temperature and connected to the valve assembly; and
the pressing member being configured to no longer press against the sliding valve of the valve assembly at and above the predetermined temperature to allow the sliding valve of the valve assembly to slide to the second position to thereby stop fluid flow through the valve assembly;
wherein the housing further includes a thermal member;
the thermal member maintaining the pressing member in position within the housing when the device is below a predetermined temperature;
the thermal member melting or softening at or above the predetermined temperature to allow the pressing member to slide in the housing under a force of the sliding valve of the valve assembly to thereby stop fluid flow through the valve assembly; and
wherein the housing includes an externally threaded end.

15. The connection assembly of claim 14, wherein:
the housing includes a non-circular shaped outer surface portion to assist in rotating the housing to screw the externally threaded end into a fluid accepting device for accepting the fluid from the fluid holding container.

16. A pressure regulator configured to be connected to a flammable fluid holding container having a Schrader valve including a sliding valve having an open position for allowing fluid flow through the Schrader valve and a closed position for preventing fluid flow through the Schrader valve, the pressure regulator comprising:
a pressure regulator housing having an inlet and an outlet, the pressure regulator regulating flow of fluid through the pressure regulator; and
a fire safety fluid flow device for engagement with the Schrader valve and the inlet of the pressure regulator, the fire safety fluid flow device including a fire safety housing having a fluid path therethrough, the fire safety housing having a pressing member and a thermal member;
the pressing member being located within the fire safety housing, the pressing member pressing against the sliding valve of the Schrader valve when the pressure regulator is engaged with the flammable fluid holding container to move the sliding valve to the open position from the closed position to allow fluid flow through the Schrader valve;
the pressing member continuing to maintain the sliding valve in the open position when the device is below a predetermined temperature and connected to the Schrader valve; and
the pressing member being configured to no longer press against the sliding valve of the Schrader valve at and above the predetermined temperature to allow the sliding valve of the Schrader valve to slide to the closed position to thereby stop fluid flow through the Schrader valve;
wherein the pressing member includes at least a portion of the fluid path;
wherein the thermal member abuts an outside surface of the pressing member when the device is below the predetermined temperature to allow the pressing member to continue to maintain the sliding valve in the open position; and
wherein the pressing member is unable to be removed from the housing both above and below the predetermined temperature.

17. The pressure regulator of claim 16, wherein:
the thermal member melts or softens at or above the predetermined temperature to allow the pressing member to slide in the fire safety housing under a force of the sliding valve of the Schrader valve to thereby stop fluid flow through the Schrader valve.

18. The pressure regulator of claim 17, wherein:
the fire safety housing includes a hole therethrough; and
the pressing member and the thermal member are located in the hole of the fire safety housing.

19. The pressure regulator of claim 18, wherein:
the thermal member comprises a ring surrounding the pressing member.

20. A pressure regulator configured to be connected to a flammable fluid holding container having a Schrader valve including a sliding valve having an open position for allowing fluid flow through the Schrader valve and a closed position for preventing fluid flow through the Schrader valve, the pressure regulator comprising:
a pressure regulator housing having an inlet and an outlet, the pressure regulator regulating flow of fluid through the pressure regulator; and
a fire safety fluid flow device for engagement with the Schrader valve and the inlet of the pressure regulator, the fire safety fluid flow device including a fire safety housing having a fluid path therethrough, the fire safety housing having a pressing member;

the pressing member being located within the fire safety housing, the pressing member pressing against the sliding valve of the Schrader valve when the pressure regulator is engaged with the flammable fluid holding container to move the sliding valve to the open position from the closed position to allow fluid flow through the Schrader valve;

the pressing member continuing to maintain the sliding valve in the open position when the device is below a predetermined temperature and connected to the Schrader valve; and the pressing member being configured to no longer press against the sliding valve of the Schrader valve at and above the predetermined temperature to allow the sliding valve of the Schrader valve to slide to the closed position to thereby stop fluid flow through the Schrader valve;

wherein the fire safety housing further includes a thermal member;

the thermal member maintaining the pressing member in position within the fire safety housing when the device is below a predetermined temperature;

the thermal member melting or softening at or above the predetermined temperature to allow the pressing member to slide in the fire safety housing under a force of the sliding valve of the Schrader valve to thereby stop fluid flow through the Schrader valve;

wherein the fire safety housing includes a hole therethrough, and the pressing member and the thermal member are located in the hole of the fire safety housing;

wherein the thermal member comprises a ring surrounding the pressing member;

wherein the ring is located between a ridge in the hole of the fire safety housing and a step on an outside surface of the pressing member; and wherein the pressing member is unable to be removed from the housing both above and below the predetermined temperature.

21. A pressure regulator configured to be connected to a flammable fluid holding container having a Schrader valve including a sliding valve having an open position for allowing fluid flow through the Schrader valve and a closed position for preventing fluid flow through the Schrader valve, the pressure regulator comprising:

a pressure regulator housing having an inlet and an outlet, the pressure regulator regulating flow of fluid through the pressure regulator; and a fire safety fluid flow device for engagement with the Schrader valve and the inlet of the pressure regulator, the fire safety fluid flow device including a fire safety housing having a fluid path therethrough, the fire safety housing having a pressing member;

the pressing member being located within the fire safety housing, the pressing member pressing against the sliding valve of the Schrader valve when the pressure regulator is engaged with the flammable fluid holding container to move the sliding valve to the open position from the closed position to allow fluid flow through the Schrader valve;

the pressing member continuing to maintain the sliding valve in the open position when the device is below a predetermined temperature and connected to the Schrader valve; and the pressing member being configured to no longer press against the sliding valve of the Schrader valve at and above the predetermined temperature to allow the sliding valve of the Schrader valve to slide to the closed position to thereby stop fluid flow through the Schrader valve;

wherein the fire safety housing further includes a thermal member;

the thermal member maintaining the pressing member in position within the fire safety housing when the device is below a predetermined temperature;

the thermal member melting or softening at or above the predetermined temperature to allow the pressing member to slide in the fire safety housing under a force of the sliding valve of the Schrader valve to thereby stop fluid flow through the Schrader valve; and wherein the fire safety housing includes an externally threaded end;

wherein the pressure regulator housing includes an internally threaded end; and wherein the fire safety housing is configured to be engaged with the pressure regulator by screwing the externally threaded end of the fire safety housing into the internally threaded end of the pressure regulator housing.

22. The pressure regulator of claim 21, wherein:

the fire safety housing includes a non-circular shaped outer surface portion to assist in rotating the fire safety housing to screw the externally threaded end into the internally threaded end of the pressure regulator housing.

23. A pressure regulator configured to be connected to a flammable fluid holding container having a Schrader valve including a sliding valve having an open position for allowing fluid flow through the Schrader valve and a closed position for preventing fluid flow through the Schrader valve, the pressure regulator comprising:

a pressure regulator housing having an inlet and an outlet, the pressure regulator regulating flow of fluid through the pressure regulator; and a fire safety fluid flow device for engagement with the Schrader valve and the inlet of the pressure regulator, the fire safety fluid flow device including a fire safety housing having a fluid path therethrough, the fire safety housing having a pressing member;

the pressing member being located within the fire safety housing, the pressing member pressing against the sliding valve of the Schrader valve when the pressure regulator is engaged with the flammable fluid holding container to move the sliding valve to the open position from the closed position to allow fluid flow through the Schrader valve;

the pressing member continuing to maintain the sliding valve in the open position when the device is below a predetermined temperature and connected to the Schrader valve; and the pressing member being configured to no longer press against the sliding valve of the Schrader valve at and above the predetermined temperature to allow the sliding valve of the Schrader valve to slide to the closed position to thereby stop fluid flow through the Schrader valve;

wherein the pressure regulator housing includes an internally threaded portion for connecting the pressure regulator to the Schrader valve.

24. A connection assembly for a flammable fluid holding container comprising:

a valve assembly including a sliding valve, the sliding valve comprising a valve head having a first position allowing fluid flow through the sliding valve and a second position preventing fluid flow through the sliding valve, the valve assembly including a biasing member biasing the valve head to the second position; and a fluid flow device configured to be engaged with the valve assembly, the fluid flow device including a housing having a fluid path therethrough, the housing having a pressing member and a thermal member;

the pressing member being located within the housing, the pressing member pressing against the sliding valve when engaged with the valve assembly to move the valve head to the first position from the second position to allow fluid flow through the valve assembly;

the pressing member continuing to maintain the valve head in the first position when the device is below a predetermined temperature and connected to the valve assembly; and the pressing member being configured to no longer press against the sliding valve of the valve assembly at and above the predetermined temperature to allow the valve head of the valve assembly to slide to the second position to thereby stop fluid flow through the valve assembly;

wherein the pressing member includes at least a portion of the fluid path;

wherein the thermal member abuts, but is not connected to, an outside surface of the pressing member when the device is below the predetermined temperature to allow the pressing member to continue to maintain the sliding valve in the first position; and the biasing member is located between the valve head and the pressing member.

* * * * *